Jan. 18, 1944.　　　O. M. BARNES　　　2,339,597
AUTOMATIC DRILL PRESS
Filed July 29, 1942　　　2 Sheets-Sheet 1

Witness:
Burr W. Jones

INVENTOR.
Orland M. Barnes
BY Clinton S. James
ATTORNEY

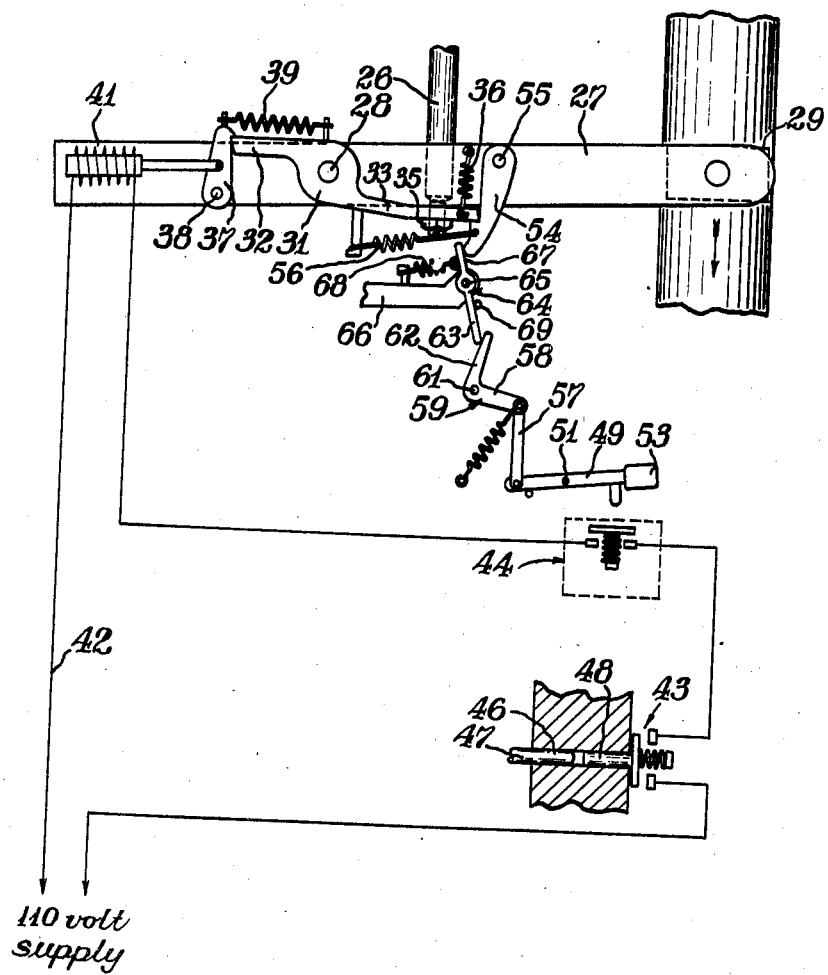

Patented Jan. 18, 1944

2,339,597

UNITED STATES PATENT OFFICE 2,339,597

AUTOMATIC DRILL PRESS

Orland M. Barnes, Horseheads, N. Y., assignor to Bendix Aviation Corporation, South Bend, Ind., a corporation of Delaware Application July 29, 1942, Serial No. 452,742

4 Claims. (Cl. 192—125)

The present invention relates to an automatic drill press and more particularly to a safety controlling device for preventing undesired actuation of the feeding mechanism of the press.

In some commercial forms of drill press it is customary to have a controlling mechanism which prevents actuation of the feeding mechanism of the press except when the work is properly positioned for the operation to be performed thereon. It sometimes happens, however, that after such a device has been tripped to cause actuation, it may fail to return to its locating position, and thus may permit re-actuation of the press when the work has been removed or displaced. The first contingency results in a loss of time, and the second may also involve damage to the work, the drills and/or drill jigs and work holders.

It is an object of the present invention to provide a novel safety latch for drill presses which is reliable and positive in action and readily applied to existing types of machinery.

It is another object to provide such a device which supplements the action of any controlling device presently in use, without interfering with the function thereof.

It is another object to provide such a device which adds no extra duty and requires no additional motion on the part of the operator in the normal actuation of the drill press.

Further objects and advantages will be apparent from the following description taken in connection with the accompanying drawings in which:

Fig. 3 is an enlarged detail partly in side elevation and partly in diagrammatic form showing the latching mechanism for the clutch operating means, and the controlling devices therefor.

Figures 1, 2:
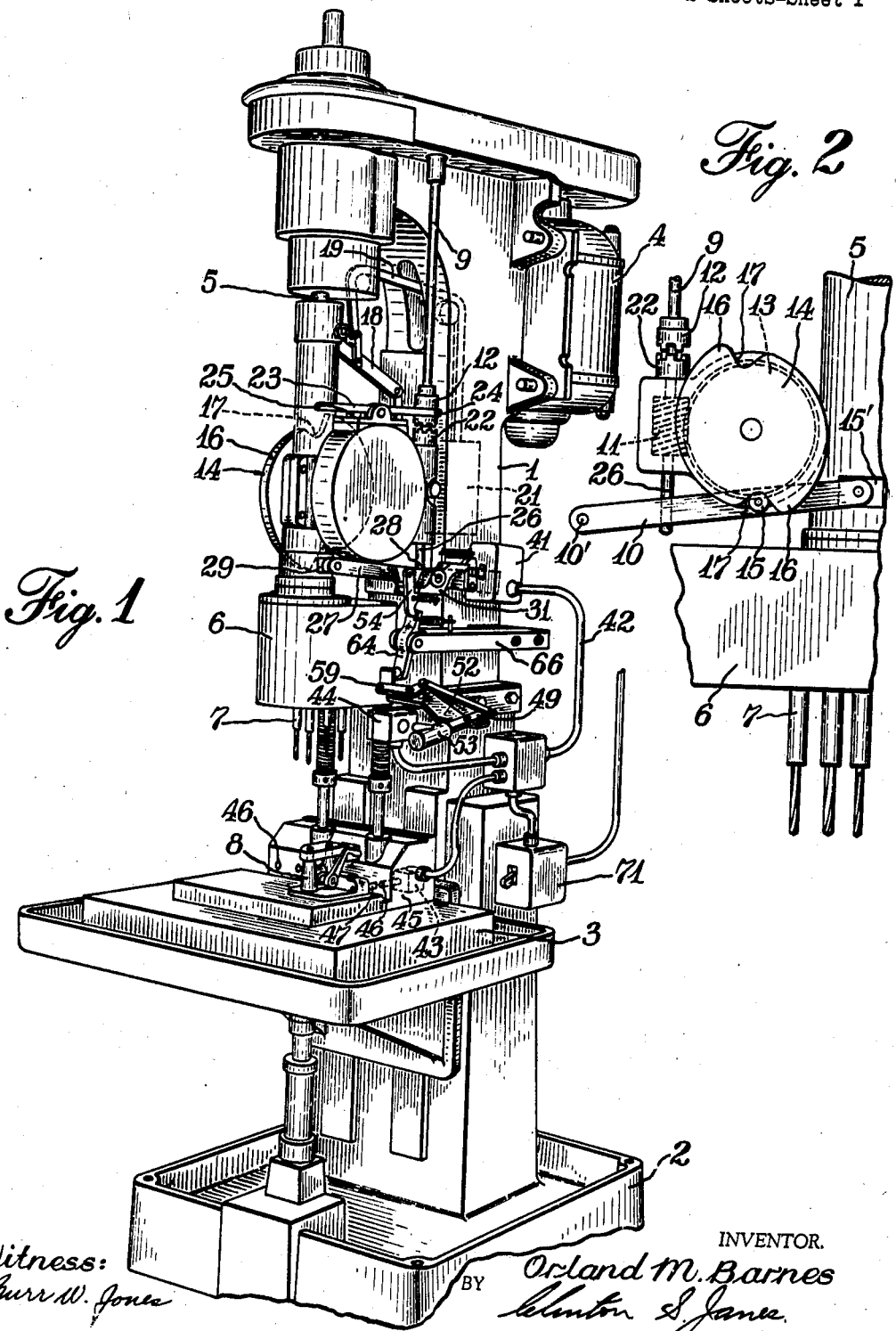
Fig. 1 is a perspective view of an automatic drill press embodying a preferred form of the present invention.
Fig. 2 is a detail in side elevation to a slightly enlarged scale showing the means for reciprocating the drill head.

In Fig. 1 of the drawings there is illustrated a conventional type of automatic drill press comprising a frame 1 mounted on a base 2 carrying an adjustable work table 3 and having at its upper end a motor 4 connected by gearing to a drive spindle 5. A drill head 6 is mounted to slide vertically on the frame 1 and is provided with a plurality of drill holders 7 driven by suitable gearing from the drive spindle 5 and arranged to operate on work which is held in a drill jig 8 mounted on the table 3.

Means for reciprocating the drill head 6 is provided comprising a drive shaft 9 rotated in any suitable manner by the motor 4, a worm gear 11 (Fig. 2) adapted to be clutched to the drive shaft 9 by means of a clutch sleeve 12 splined on said shaft, a worm wheel 13 meshing with the worm 11 and a cam member 14 rotatable with the worm wheel 13 and engaging a follower 15 on a lever 10 pivoted at 10' to the frame 1, and connected to the drill head by a sliding pivot block 15'. The cam 14 is provided with two similar lobes 16 separated by notches 17 whereby rotation of the cam through a half revolution from the position illustrated in Fig. 1 causes the head to be advanced toward the work rapidly at first when the follower is pushed out of the notch 17, and then at a proper speed for forcing the drills through the work by virtue of the contour of the load 16.

Means for retracting the drill head is provided in the form of a lever 18 pivoted to the frame 1 and connected to the drill head, said lever being connected by a flexible chain 19 with a weight 21 suspended in the frame 1.

The clutch sleeve 12 is urged into engagement with the correspondingly toothed end 22 of the worm 11 by means of a lever 23 connected to the sleeve by a yoke 24 and actuated by a spring pressed member 25. Means for opening the clutch to render the feeding means inoperative is provided in the form of a push rod 26 slidably mounted within the worm 11 and having a thrust bearing connection with the clutch sleeve 12. Means for actuating the thrust rod 26 from the notch of the drill head 6 is provided in the form of a lever 27 pivoted to the frame 1 at 28 and having a slide connection 29 with the drill head at its free end. A second lever 31 (Fig. 3) having two arms 32 and 33 is pivoted at 28 on lever 27. The arm 33 is provided with an adjustable thrust bearing 35 for engaging the lower end of the push rod 26, and a spring 36 is arranged to draw the arm 33 toward the end of said push rod.

According to the present invention, two separate controlling mechanisms are provided for the lever 31, one of said controlling mechanisms operating to prevent closure of the clutch 12, 22 and consequent actuation of the feeding mechanism for the drill head when the work is not properly positioned, and both controlling mechanisms being arranged to be simultaneously tripped by a single manipulation by the operator.

The first controlling means comprises a latch 37 pivoted at 38 to the lever 27 and urged into engagement with the arm 32 of lever 31 by means of a spring 39. The latch is controlled by means of a solenoid 41 which is connected at one end to a source of electrical energy by means of a conductor 42, and at its other end is connected to said source through two normally open switches 43 and 44. Switch 43 is mounted in a locating block 45 (Fig. 1) provided with guide openings 46 adapted to receive dowels 47 on the work holder 8 so as to positively locate said work holder in operative position. When so located, the dowel 47 engages the stem 48 of switch 43 to cause closure of said switch. Manually operable means for closing the switch 44 is provided in the form of a trip lever 49 pivoted at 51 to a bracket 52 fixed to the frame 1 and having a suitable handle 53 for actuation by the operator.

The second controlling mechanism for the lever 31 comprises a second latch 54 pivoted at 55 to the lever 27 and urged into engagement with the arm 33 of lever 31 by a spring 56. Means for tripping this latch simultaneously with closure of the manually operable switch 44 is provided in the form of a mechanical connection from the manually controlled lever 49. This mechanical connection is shown as developed into a single plane in Fig. 3 for the sake of clarity. It comprises a link 57 connecting the end of lever 49 to one arm 58 of a bell crank lever 59 pivoted at 61 to the bracket 52. The other arm 62 of the bell crank lever engages one arm 63 of a lever 64 pivoted at 65 on a bracket 66, the other arm 67 of lever 64 being arranged to engage the end of latch 54 and draw it away from the arm 33 of lever 31 when the handle 53 of lever 49 is manipulated to close switch 44. A spring 68 is preferably provided for drawing the lever 64 toward its normal position as defined by a stop 69.

In operation, when it is desired to actuate the drill, the motor 4 is started by means of closure of a power switch such for instance as illustrated at 71, whereby the power shaft 5 is rotated to rotate the drill holder 7, and the drive shaft 9 is also rotated to rotate the clutch member 12. The operator then moves the work holder and drill jig 8 into operative position, thus causing closure of the switch 43, and then strikes the handle 53 which releases the latch 54 and closes switch 44 thus energizing solenoid 41 to release the latch 37. Lever 31 is thus permitted to rotate on its pivot 28, allowing the push rod 26 to drop and permit lever 23 to move clutch member 12 into engagement with the worm clutch member 22. The consequent rotation of the worm 11 is transmitted through the worm wheel 13 to the cam 14 whereby the drill head 6 is advanced toward the work by the cam follower 15 as it is forced out of the notch 17 of the cam and then traversed more slowly by the cam 16.

When the drill head 6 approaches its lowermost position, the lever 27 is moved thereby sufficiently to carry the arm 33 of lever 31 beyond the travel of the push rod 26. The spring 36 is thus enabled to swing the lever 31 back to its normal position and since the operator releases the handle 53 immediately after actuation thereof, both the latches 37 and 54 engage the ends 32 and 33 of lever 31 and lock it to the lever 27. When the cam 14 rotates sufficiently for the cam follower to enter the next notch 17, the retracting mechanism for the drill head is permitted to raise the head, and in so doing, the lever 31 is raised and engages the push rod 26 to open the clutch 12, 22 and thus disable the feed mechanism until such time as the operator re-actuates the control lever 49.

It will be seen that there is here provided a positive mechanical means for preventing actuation of the feeding mechanism which insures that there shall be only one advancement of the drill head for each actuation of the control lever, and that this positive control is secured without involving any additional manipulation on the part of the operator.

Although but one embodiment of the invention has been shown and described in detail, it will be understood that other embodiments are possible and that various changes may be made in the design and arrangement of the parts without departing from the spirit of the invention as defined in the claims appended hereto.

What is claimed is:

1. In an automatic drill press a slidable drill head, means for advancing the head toward the work, means including a latch preventing actuation of the advancing means when the work is out of operative position, mechanical means including a second latch also preventing actuation of the advancing means, and manually operable means for tripping simultaneously both said latches.

2. In an automatic drill press a slidable head, means for reciprocating the head including a clutch, means actuated by movement of the head to open said clutch, means controlled by the work when in operative position for rendering said opening means inoperative, auxiliary means for rendering the opening means inoperative, and manually operable means for disabling simultaneously both the last mentioned means.

3. In an automatic drill press a slidable head, means for advancing the head toward the work including a clutch, means for retracting the head, means actuated by the retracting movement of the head to open said clutch, latch means controlled by the work when in operative position for rendering said opening means inoperative, auxiliary latch means for rendering the opening means inoperative, and manually operable means for disabling simultaneously both said latch means.

4. In an automatic drill press a sliding head, traversing means therefor, including a clutch, spring means for closing the clutch, means for opening the clutch including a push rod, a lever connected to move with the head, a second lever pivotally mounted on the first lever adapted to engage the push rod, a pair of latches on the first lever adapted to engage the second lever, electrical means controlled by placing the work in operative position for withdrawing one latch, and manually operable means for simultaneously actuating the electrical means and mechanically withdrawing the second latch.

ORLAND M. BARNES.